United States Patent

Akamine et al.

(10) Patent No.: US 9,594,965 B2
(45) Date of Patent: Mar. 14, 2017

(54) LANE BOUNDARY LANE RECOGNITION DEVICE AND COMPUTER-READABLE STORAGE MEDIUM STORING PROGRAM FOR RECOGNIZING LANE BOUNDARY LINES ON ROADWAY

(71) Applicant: DENSO CORPORATION, Kariya, Aichi-pref. (JP)

(72) Inventors: Yusuke Akamine, Nishio (JP); Naoki Kawasaki, Kariya (JP); Tomohiko Tsuruta, Aichi-ken (JP); Shunsuke Suzuki, Aichi-ken (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 40 days.

(21) Appl. No.: 14/830,200

(22) Filed: Aug. 19, 2015

(65) Prior Publication Data

US 2016/0055383 A1 Feb. 25, 2016

(30) Foreign Application Priority Data

Aug. 20, 2014 (JP) .................................. 2014-167166

(51) Int. Cl.
*G06K 9/00* (2006.01)
*G06K 9/03* (2006.01)

(52) U.S. Cl.
CPC ......... *G06K 9/00798* (2013.01); *G06K 9/033* (2013.01)

(58) Field of Classification Search
CPC ................................................ G06K 9/00798
See application file for complete search history.

(56) References Cited

U.S. PATENT DOCUMENTS

| | | | |
|---|---|---|---|
| 9,063,548 B1* | 6/2015 | Ferguson | G05D 1/0231 |
| 2010/0228437 A1 | 9/2010 | Hanzawa et al. | |
| 2010/0259617 A1* | 10/2010 | Kawasaki | G06K 9/00798 348/148 |
| 2011/0200258 A1* | 8/2011 | Suzuki | G06K 9/00798 382/199 |
| 2013/0272577 A1* | 10/2013 | Sakamoto | G08G 1/167 382/103 |

(Continued)

FOREIGN PATENT DOCUMENTS

| | | |
|---|---|---|
| JP | 2000-207563 A | 7/2000 |
| JP | 2001-086636 A | 3/2001 |

(Continued)

*Primary Examiner* — Oneal R Mistry
(74) *Attorney, Agent, or Firm* — Knobbe, Martens, Olson & Bear, LLP

(57) ABSTRACT

In a lane boundary line recognition device, a calculation section calculates a degree of uncertainty which affects a correct recognition of white lines on a roadway of a vehicle. A learning section updates a learning value of the degree of uncertainty. A recognition suppression section suppresses execution of a recognition process of recognizing white lines on the roadway when the updated learning value is more than a threshold value. An environment change judgment section judges whether or not a road environment has changed. A learning resetting section resets the learning value of the degree of uncertainty to a previous learning value when the detection result of the environment change judgment section indicates an occurrence of change of the road environment.

11 Claims, 2 Drawing Sheets

(56) References Cited

U.S. PATENT DOCUMENTS

2014/0379164 A1* 12/2014 Joh ........................ G01C 21/30
                                                                               701/1
2015/0169966 A1* 6/2015 Ishimaru ................ G08G 1/167
                                                                               348/148

FOREIGN PATENT DOCUMENTS

| JP | 2013-250874 A | 12/2013 |
| WO | 2007/074591 A1 | 7/2007 |

\* cited by examiner

LANE BOUNDARY LANE RECOGNITION DEVICE AND COMPUTER-READABLE STORAGE MEDIUM STORING PROGRAM FOR RECOGNIZING LANE BOUNDARY LINES ON ROADWAY

CROSS-REFERENCE TO RELATED APPLICATION

This application is related to and claims priority from Japanese Patent Application No. 2014-167166 filed on Aug. 20, 2014, the contents of which are hereby incorporated by reference.

BACKGROUND OF THE INVENTION

1. Field of the Invention

The present invention relates to lane boundary line recognition devices and computer-readable storage mediums for storing programs capable of recognizing lane boundary lines on a roadway on which an own vehicle drives on the basis of images captured by an in-vehicle camera, and assisting a driver of the own vehicle in order to perform driving safely.

2. Description of the Related Art

There are various techniques of recognizing lane boundary lines on a roadway, on which an own vehicle drives, on the basis of images of the roadway captured by an in-vehicle camera, etc., and performing a driver assist of the own vehicle on the basis of the recognized lane boundary lines. There has been proposed a driver assist technology capable of suppressing recognition of lane boundary lines on a roadway, on which an own vehicle drives, when the vehicle drives on a roadway which is not suitable for correct recognition of the lane boundary lines on the roadway.

For example, a patent document 1, Japanese patent laid open publication No. 2001-88636, discloses an external observation device mounted on a vehicle. This external observation device performs a fail safe operation which temporarily interrupts a usual observation control when the vehicle is running on a snowy road, i.e. a snow-covered road and snow lies on shoulders of the snowy road because it is difficult for the external observation device to obtain adequate information for correctly detecting lane boundary lines such as white lines on the snowy road.

The external observation device according to the patent document 1 judges the condition of the roadway on the basis of instantaneous images captured by the in-vehicle camera of the vehicle. This introduces a possible problem of it being difficult to suppress the recognition of the lane boundary lines stably. On the other hand, when using a filter to perform the stable recognition operation, the external observation device provides a possible problem of it being difficult to quickly restart the recognition of lane boundary lines immediately after the road condition has changed to be suitable for performing a correct recognition of the lane boundary lines on the roadway.

SUMMARY

It is therefore desired to provide a lane boundary line recognition device capable of stably suppressing a recognition operation of recognizing lane boundary lines when an own vehicle drives on a roadway, which is not suitable for performing a correct recognition of lane boundary lines, and capable of having a quick response to a change of a road condition.

An exemplary embodiment provides a lane boundary line recognition device capable of recognizing lane boundary lines such as white lines on the basis of road images captured by an in-vehicle camera. The lane boundary line recognition device has a calculation section, a learning section, a recognition suppression section, an environment change judgment section and a learning resetting section. The calculation section calculates a degree of uncertainty which affects a correct recognition of white lines as lane boundary lines on a roadway on which an own vehicle drives. The learning section updates a learning value of a degree of uncertainty which affects the correct recognition of lane boundary lines. The recognition suppression section suppresses an execution of recognizing lane boundary lines when the learning value of the degree of uncertainty updated by the learning section is more than a threshold value. The environment change judgment section judges whether or not a road environment (or a road state) has changed. The learning resetting section resets the learning value of the degree of uncertainty to a previous learning value when the detection result of the environment change judgment section indicates an occurrence of change of the road environment.

In the lane boundary line recognition device according to the present invention, the degree of uncertainty of a road image is calculated. The calculated degree of uncertainty affects the correct recognition of lane boundary lines such as white lines, on a drive road on which the own vehicle drives, extracted from the road image. Further, a learning value of the degree of uncertainty is updated on the basis of a currently calculated degree of uncertainty and a previous learning value of the degree of uncertainty. When the updated learning value is more than the threshold value, the recognition suppression process is performed. That is, because the judgment whether or not the recognition suppression process is performed is determined on the basis of the learning value of the degree of uncertainty, not using the degree of uncertainty currently calculated from the road image instantaneously captured by the in-vehicle camera. This makes it possible to suppress stably the execution of the lane boundary lines recognition process when the updated learning value is more than the threshold value.

Further, the lane boundary line recognition device according to the present invention judges whether or not the road environment, i.e. the road state changes. When the detection result indicates that the road environment changes, the learning value of the degree of uncertainty is returned to a previous learning value. It is therefore possible for the lane boundary line recognition device to quickly response to a rapid change of the road environment and speedily recognize lane boundary lines on the roadway when the road environment changes from unrecognizable state to a recognizable state to be suitable for performing the correct recognition of lane boundary lines.

Accordingly, it is possible for the lane boundary line recognition device according to the present invention to stably perform the lane boundary line recognition suppression process when the road environment is in the unrecognizable state, not suitable for performing the correct recognition of lane boundary lines such as white lines, and to provide a quick response even if the road environment suddenly changes.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
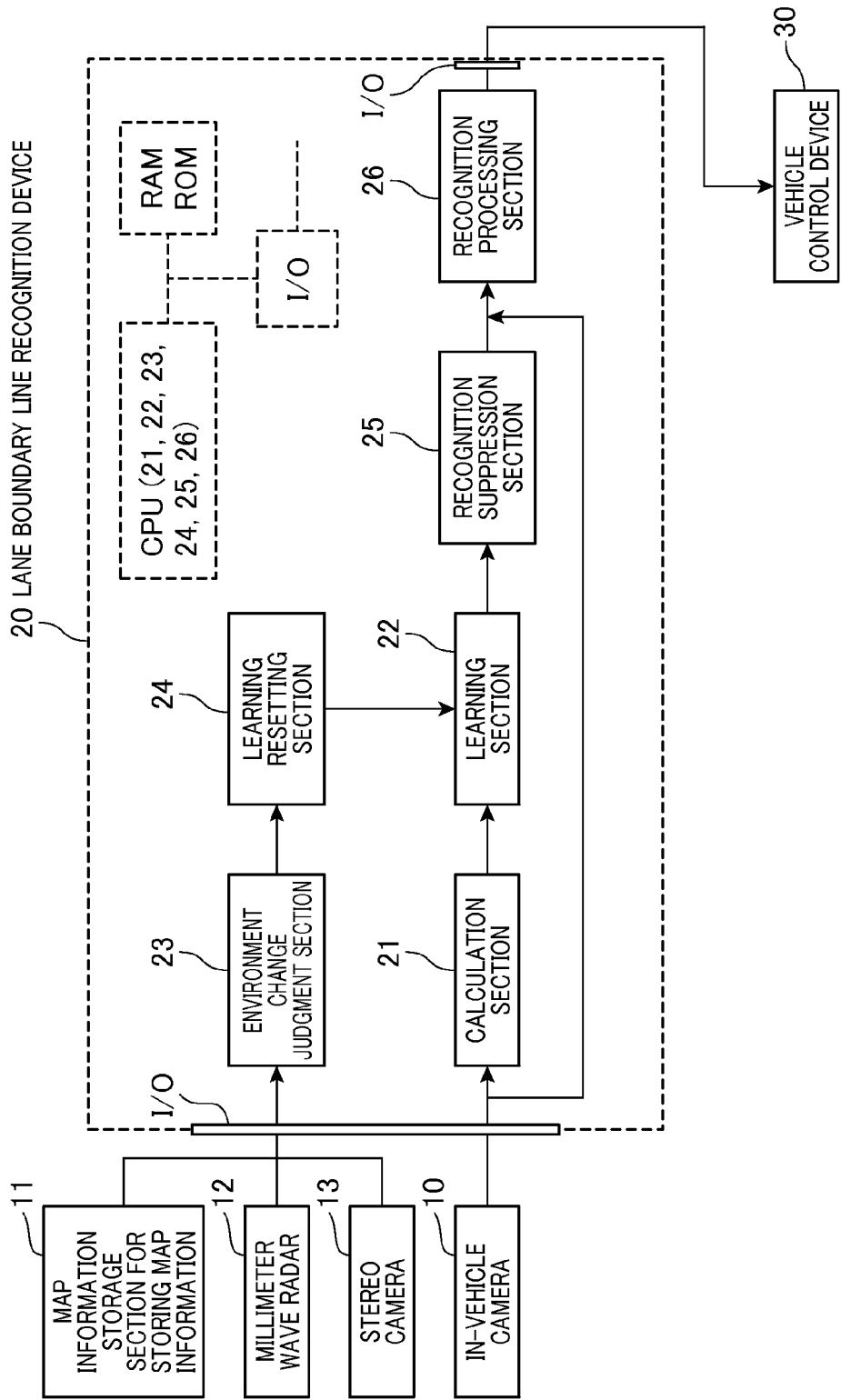
FIG. 1 is a view showing a structure of a lane boundary line recognition device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a lane boundary line recognition device according to an exemplary embodiment with reference to FIG. 1, FIG. 2 and FIG. 3.

FIG. 1 is a view showing a structure of the lane boundary line recognition device 20 according to the exemplary embodiment.

The lane boundary line recognition device 20 recognizes lane boundary lines such as white lines on a roadway on which an own vehicle drives. The recognized lane boundary lines are used for a drive assist such as a lane keeping assist control (LKA control) and a lane departure warning.

The own vehicle is equipped with an in-vehicle camera 10. The in-vehicle camera 10 is composed of at least one of a CCD (charge coupled device) camera, a CMOS (complementary Metal oxide Semiconductor) sensor, a near infrared camera, etc. The in-vehicle camera 10 captures image of a surrounding area of the own vehicle. In more detail, for example, the in-vehicle camera 10 is arranged near at upper side of a windshield of the own vehicle. The in-vehicle camera 10 outputs the captured image of the roadway to the lane boundary line recognition device 20.

The lane boundary line recognition device 20 according to the exemplary embodiment is a computer system equipped with a central processing unit (CPU), a memory storage section such as a random access memory (RAM), a read only memory (ROM), etc. and an input/output (I/O) interface, etc. For example, the ROM as a computer-readable storage medium stores one or more programs for causing the CPU in the computer system to execute functions of the lane boundary line recognition device 20. The lane boundary line recognition device 20 according to the exemplary embodiment has a calculation section 21, a learning section 22, an environment change judgment section 23, a learning resetting section 24, a recognition suppression section 25 and a recognition process section 26. The calculation section 21 calculates a degree of uncertainty. The learning section 22 learns the degree of uncertainty.

That is, the CPU in the computer system reads and performs a program stored in the ROM, and executes the program which corresponds to the function of the calculation section 21 of calculating a degree of uncertainty, the function of the learning section 22 of learning the degree of uncertainty, the function of the environment change judgment section 23, the function of the learning resetting section 24, the function of the recognition suppression section 25, and the function of the recognition processing section 26. It is acceptable for the computer system to read and perform the lane boundary line recognition program stored in the memory storage medium.

The calculation section 21 calculates a degree of uncertainty over a correct recognition of white lines from the captured image. That is, the degree of uncertainty affects the correct recognition of white lines as lane boundary lines, on the roadway on which the own vehicle drives, extracted from a road image captured by the in-vehicle camera 10. When snow lies on the roadway, there is a possible case of it being difficult for the lane boundary line recognition device 20 to correctly recognize white lines on the roadway because the white lines are covered with snow. Further, when ruts are formed on a snowy road, a boundary between the ruts and the snow on the roadway becomes a white straight shape, and the lane boundary line recognition device 20 performs an incorrect recognition that the rut of a white straight shape is a white line as the lane boundary line on the road way. By the way, a rut is a depression or groove worn into a road by the travel of wheels of a vehicle. Still further, there is a possible incorrect detection for the lane boundary line recognition device 20 to recognize as a white line a gravel road and puddles in a road on the basis of the reflection light from them. That is, when at least one of various uncertainty factors such as snow, gravel, puddles, etc. is present on the roadway, this reduces the detection accuracy of correctly detecting white lines on the roadway.

In order to eliminate this problem, the calculation section 21 in the lane boundary line recognition device 20 calculates a degree of uncertainty over the road image, i.e. of an unclear state or a blurry state of the road image instantaneously captured by the in-vehicle camera 10. The uncertainty factor becomes noise when the lane boundary line recognition device 20 detects the white lines on the roadway. When ruts are formed on the snowy road, a surface of the rut exposed to the surface of the roadway is black color, and the area between the ruts on the snowy road becomes white color. The calculation section 21 calculates the degree of uncertainty on the basis of a difference between a large brightness below the wheels and a brightness directly below the body of the own vehicle. The larger brightness is selected from a brightness below the right side wheel and a brightness below the left side wheel of the own vehicle.

In addition, when the roadway is a gravel road, a plurality of edges is detected from the captured road image, and a large fluctuation occurs due to an incline of a white line candidate to the own vehicle and a gravel amount at a lateral side of the own vehicle. Accordingly, the calculation section 21 calculates a degree of uncertainty of a gravel road on the basis of the number of edges extracted from the instantaneously captured road image, an incline of the detected white line candidate to the own vehicle, and a change value of the gravel amount at a lateral side of the own vehicle. Further, when a puddle is present on the road surface, a very high brightness occurs intermittently in the captured road image. Accordingly, the calculation section 21 calculates a degree of uncertainty of reflection light which represents the degree in presence of the reflection objects on the basis when a very high brightness is detected in the instantaneously captured road image and the fluctuation of the position of the reflection objects.

The learning section 22 as a learning means performs the learning of a degree of uncertainty, i.e. calculates a learning value of the degree of uncertainty calculated by the calculation section 21 using the instantaneously captured road image.

The learning section 22 updates, i.e. rewrites the learning value of the degree of uncertainty on the basis of the currently-calculated degree of uncertainty and a previously calculated learning value of the degree of uncertainty. For example, the learning section 22 calculates a weighted average of the currently calculated degree of uncertainty and the previously calculated learning value of the degree of uncertainty stored in the memory section. The learning section 22 stores the currently-calculated learning value of the degree of uncertainty into the memory section, for example, the RAM or ROM. The more a weight of the previous learning value increases, the more the stability of the learning value of the degree of uncertainty increases.

The environment change judgment section 23 as a judgment means judges whether or not a road environment has changed. Because the degree of uncertainty varies due to the road environment, a great change of the degree of uncertainty often occurs when the road environment changes.

In general, because there is no snow, puddle, etc. in a tunnel and on a road below an elevated road, they have a low degree of uncertainty as compared with general roadway other than the tunnel and elevated road. Further, because there are often gravel and puddle on a causeway, the causeway has a high degree of uncertainty as compared with that of the roadway other than such a causeway. Still further, a highway has a low degree of uncertainty as compared with that of a general road. Further, there is often a possible case in which an own vehicle lane on which the own vehicle drives has a degree of uncertainty which is different from that of other drive lanes and an intersection or a junction. Accordingly, the environment change judgment section 23 in the lane boundary line recognition device 20 according to the exemplary embodiment judges that the road environment greatly changes, i.e. the degree of uncertainty is greatly changed when the own vehicle enters and goes out a tunnel, a road under an elevated road, a causeway, a junction, an interchange, and another drive lane.

Specifically, the environment change judgment section 23 judges whether or not a road environment or a road state changes on the basis of map information stored in a map information storage section 11 (see FIG. 1) and a current location of the own vehicle. That is, it is possible for the environment change judgment section 23 to correctly judge with high accuracy whether or not the own vehicle enters and goes out a tunnel, a road under an elevated road, a causeway, an interchange, a junction and another drive lane. Further, the environment change judgment section 23 judges whether or not the road environment has changed on the basis of a detection value transmitted from a millimeter wave radar 12 (see FIG. 1) mounted on the own vehicle. The millimeter wave radar 12 is a sensor capable of scanning both a horizontal direction and a vertical direction. Because the millimeter wave radar 12 detects walls at both sides on the roadway and a ceiling of a tunnel on the roadway on which the own vehicle drives, it is possible for the environment change judgment section 23 to correctly detect whether or not the own vehicle enters and goes out a tunnel, a road below an elevated road, etc. with high accuracy even if there is no information of the tunnel and the elevated road in the map information.

Furthermore, the environment change judgment section 23 judges whether or not the road environment has changed on the basis of the image captured by a stereo camera 13 mounted on the own vehicle. It is possible to detect a difference in height between a road surface and an outside area of the road surface and a road state in which a height of the road decreases when it is separated from the road surface. Accordingly, when the map information stored in the map information storage section 11 does not contain any causeway information, the environment change judgment section 23 can detect whether or not the own vehicle enters and goes out from the causeway with high accuracy. Still further, it is possible for the environment change judgment section 23 to detect whether or not the own vehicle enters and goes out from a tunnel, a roadway below an elevated road, an interchange, a junction and another drive lane on the basis of the image recognition using the road image data captured by the stereo camera 13 and/or the in-vehicle camera 10. It is acceptable for the own vehicle to have the in-vehicle camera 10 without using the stereo camera 13.

The learning resetting section 24 as a learning resetting means resets the currently calculated learning value of the degree of uncertainty to the previously calculated learning value when the judgment result of the environment change judgment section 23 indicates that the road environment changes.

Figure 2:
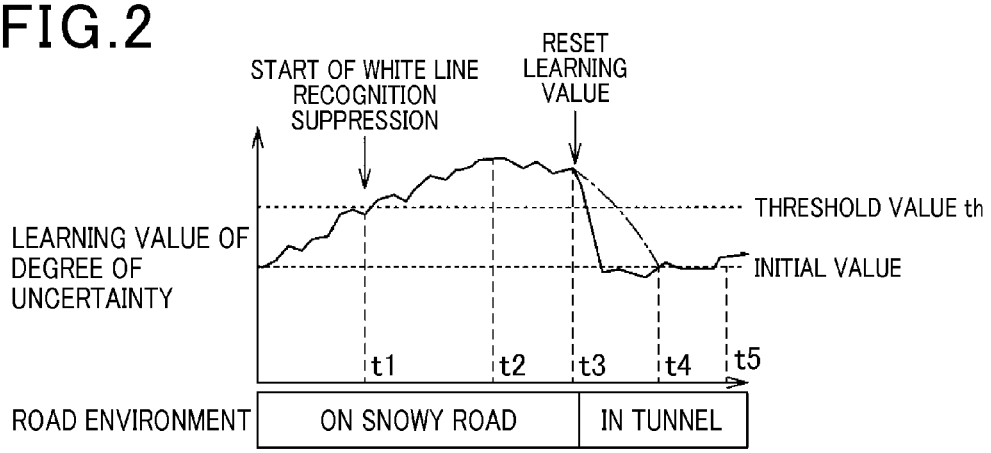
FIG. 2 is a view showing an example of changing a learning value of a degree of uncertainty which affects a correct recognition of white lines on a snowy road and on a road in a tunnel.

FIG. 2 is a view showing an example of a change of a learning value of a degree of uncertainty.

In FIG. 2, the time change of the learning value of the degree of uncertainty is designated by the solid line when the own vehicle drives on a snowy road and in a tunnel.

The lane boundary line recognition device 20 according to the exemplary embodiment uses an initial value of the learning value of the degree of uncertainty which is an intermediate value of the learning value of the degree of uncertainty which is not high and low. For example, when the own vehicle drives on a snowy road, the learning value gradually increases from the initial value. When the learning value is more than a threshold value th, the recognition suppression section 25 in the lane boundary line recognition device 20 starts the white line recognition suppression process at timing t1 (see FIG. 2) which will be explained later. The learning value of the degree of uncertainty further increases and approximately becomes a constant value at timing t2.

On the other hand, when the own vehicle drives in a tunnel during the period counted from timing t3 to timing t5, the learning value of the degree of uncertainty approximately maintains the initial value.

In a case where the own vehicle drives on the snowy road and then enters the tunnel, the learning value of the degree of uncertainty does not return immediately to the initial value as designated by the long dashed and short dashed line shown in FIG. 2 if the lane boundary line recognition device 20 continues to use the learning value obtained during the period when the own vehicle drives on the snowy road.

In this case, it is necessary to have a long period of time for the learning value of the degree of uncertainty to return to the initial value. That is, even if the own vehicle has gone into the tunnel, because it is necessary for the learning value to return to a value of less than the threshold value th, as a result, the while line recognition process cannot starts for a while.

In addition, for example, when the own vehicle drives on a roadway, the learning value of which is less than the initial value, and then enters a gravel road, it is necessary for the learning value to return to a value which is more than the threshold value th, and as a result, the while line recognition process cannot be suppressed for a while.

On the other hand, as designated by the solid line shown in FIG. 2, the learning value of the degree of uncertainty returns to the initial value when the own vehicle enters the tunnel at timing t3, when the lane boundary line recognition device 20 returns the learning value to the previous learning value, it is possible for the learning value of the degree of uncertainty to immediately restart the white line recognition process.

In a case where the own vehicle drives on a roadway having the learning value of the degree of uncertainty which is lower than the initial value, and enters a gravel road, it is possible for the learning value of the degree of uncertainty to immediately restart the white line recognition process when the lane boundary line recognition device 20 returns the learning value to the previous learning value. That is, when it is detected that the road environment has changed, it is possible to improve the white line recognition or the response of the white line recognition suppression by returning the current learning value to the previous learning value.

The learning resetting section 24 can return the learning value of the degree of uncertainty to the previous learning value of the degree of uncertainty calculated before a predetermined time, or resets the learning value of the degree of uncertainty to the initial value. When the state in which the learning value of the degree of uncertainty is more than the threshold value is continued for a long time, it is effective to return the learning value of the degree of uncertainty to the initial value.

The recognition suppression section 25 as a suppression means suppresses the execution of the while line recognition process when the learning value of the degree of uncertainty updated by the learning section 22 is more than the threshold value th. That is, the recognition suppression section 25 suppresses the execution of the white line recognition process when there is a high possibility of causing an incorrect recognition of white lines on the roadway from the road image captured by the in-vehicle camera 10. The suppression of the white line recognition indicates the following processes:

(a) The lane boundary line recognition device 20 does not recognize any white line;

(b) The lane boundary line recognition device 20 does not transmit white line information (road parameters) to a vehicle control device 30 (see FIG. 1); and (c) The lane boundary line recognition device 20 transmits a control signal which indicates a low detection accuracy of white lines to the vehicle control device 30 in order for the vehicle control device 30 to stop the execution of the driver assist of the own vehicle on the basis of the obtained white line information.

The recognition process section 26 detects white lines on the roadway on the basis of the road image captured by the in-vehicle camera 10. For example, edge points are extracted from the road image, a white line candidate having a maximum degree which passes through the extracted edge points is detected as the white line on the roadway. In a case in which the white line recognition suppression process determines to execute the recognition suppression process, the lane boundary line recognition device 20 does not detect any white line when the learning value of the degree of uncertainty is more than the threshold value th.

The recognition process section 26 transmits the detected white line information to the vehicle control device 30. When receiving the white line information, the vehicle control device 30 performs the driver assist of the own vehicle such as the LKA control and the lane departure warning on the basis of the white line information transmitted from the recognition process section 26.

Next, a description will now be given of the white line recognition process and the white line recognition suppression process with reference to the flow chart shown in FIG. 3.

Figure 3:
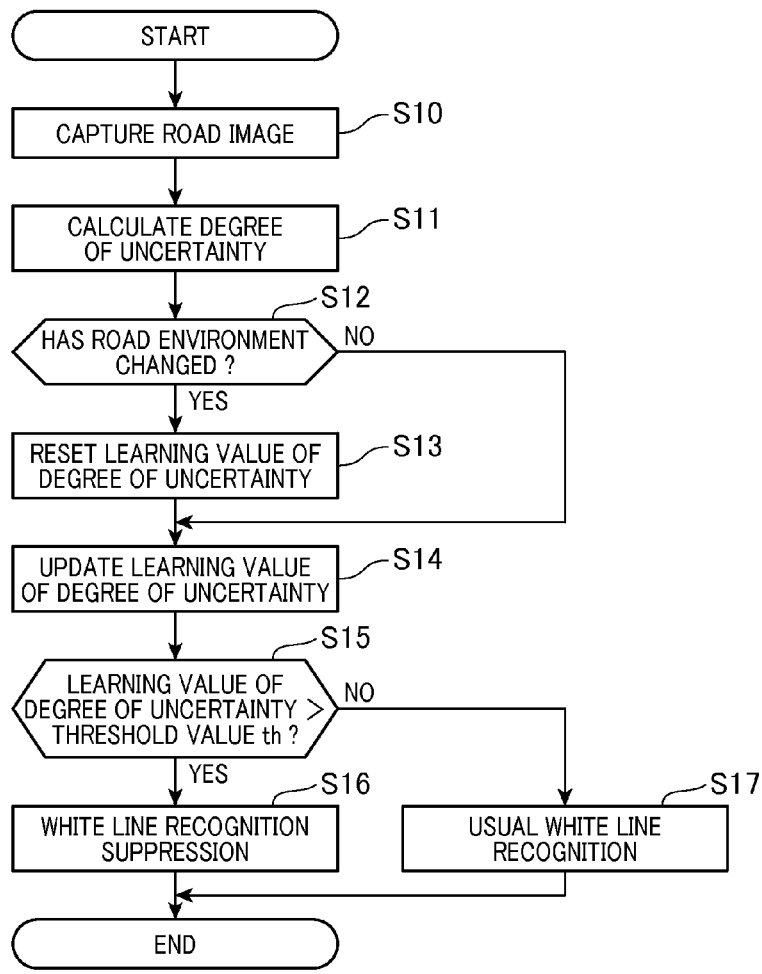
FIG. 3 is a view showing a flow chart of a white line recognition process performed by the lane boundary line recognition device according to the exemplary embodiment of the present invention.

FIG. 3 is a view showing the flow chart of the white line recognition process and the white line recognition suppression process performed by the lane boundary line recognition device 20 according to the exemplary embodiment.

The lane boundary line recognition device 20 repeatedly performs these processes in the flow chart shown in FIG. 3.

In step S10, the lane boundary line recognition device 20 receives a road image captured by the in-vehicle camera 10. The operation flow goes to step S11. In step S11, the calculation section 21 calculates a degree of uncertainty in the road image, i.e. a degree of the presence of disturbance factors such as snow, gravel, puddle, etc. on the road. The operation flow goes to step S12.

In step S12, the environment change judgment section 23 detects or judges whether or not a road environment has changed on the basis of the map information stored in the map information storage section 11, a detection value transmitted from the millimeter wave radar 12 and the image captured by the stereo camera 13.

When the detection result in step S12 indicates affirmation ("YES" in step S12), i.e. the road environment has changed, the operation flow goes to step S13.

In step S13, the learning resetting section 24 resets the learning value of the degree of uncertainty to a previously obtained learning value. The operation flow goes to step S14.

In step S14, the learning section 22 calculates a current learning value of the degree of uncertainty on the basis of the learning value obtained in step S13 and the currently obtained degree of uncertainty calculated in step S11. That is, the learning section 22 updates the learning value on the basis of the current learning value.

On the other hand, when the detection result in step S12 indicates negation ("NO" in step S12), i.e. the road environment has not changed, the operation flow goes to step S14.

In step S14, the learning section 22 calculates a current learning value of the degree of uncertainty on the basis of the learning value stored in the memory section obtained in step S13 and the currently obtained degree of uncertainty calculated in step S11. The operation flow goes to step S15.

In step S15, the recognition suppression section 25 detects whether or not the learning value of the degree of uncertainty is more than the threshold value th. When the detection result in step S15 indicates affirmation ("YES" in step S15), i.e. indicates that the learning value of the degree of uncertainty is more than the threshold value th, the operation flow goes to step S16.

In step S16, the recognition suppression section 25 suppresses the recognition of white lines. That is, the recognition suppression section 25 does not perform the white line detection process, or generates and transmits a control signal which indicates that the detected white line information is not transmitted to the vehicle control device 30. The vehicle control device 30 does not perform the driver assist on the basis of the white line information having a low detection accuracy.

On the other hand, when the detection result in step S15 indicates negation ("NO" in step S15), i.e. indicates that the learning value of the degree of uncertainty is not more than the threshold value th, the operation flow goes to step S17.

In step S17, the recognition process section 26 in the lane boundary line recognition device 20 performs the usual white line recognition process. That is, the recognition process section 26 detects white lines on the basis of the road image captured by the in-vehicle camera 10 in step S10. The recognition process section 26 outputs the detected white line information to the vehicle control device 30. The lane boundary line recognition device 20 completes the white line recognition process and the white line recognition suppression process shown in FIG. 3.

The lane boundary line recognition device 20 according to the exemplary embodiment having the structure and behavior previously described has the following effects.

Because of using the learning value of the degree of uncertainty instead of using the degree of uncertainty which is currently calculated or obtained on the basis of the road image which is currently and instantaneously captured by the in-vehicle camera 10 when it is determined whether or not the white line recognition suppression process is performed, it is possible to perform stably a correct white line recognition. Further, because of detecting an occurrence of change of the road environment, the lane boundary line recognition device 20 uses the learning value of the degree of uncertainty previously obtained when detecting the occurrence of change of the road environment. Accordingly, when the own vehicle goes out from an unclear, blurry, rough road environment, i.e. unrecognizable road environment such as snowy road, gravel road, puddle, and goes suddenly onto a good road to be suitable to perform a correct recognition of white lines, it is possible for the lane boundary line recognition device 20 to quickly perform the correct recognition of white lines. The lane boundary line recognition device 20 according to the exemplary embodiment can stably perform the white line recognition suppression process even if the own vehicle drives on a road having an unrecognizable road environment, and can quickly respond to the quick change of the road environment.

When it is detected that the road environment has changed, the lane boundary line recognition device 20 returns the learning value of the degree of uncertainty to the initial value, This makes it possible to restart the learning of the degree of uncertainty from the optimal learning value even if the learning value of the degree of uncertainty which is more than the threshold value th is continued for a long time period.

Because of correctly detecting the road environment change, for example, the own vehicle goes into a tunnel, a road below an elevated road, a causeway, an interchange, a junction and another drive lane, the lane boundary line recognition device 20 can return and use the learning value of the degree of uncertainty to the previous learning value at an optimal timing.

It is possible for the lane boundary line recognition device 20 to judge or detect the road environment change with high accuracy on the basis of the map information stored in the map information storage section 11 and the current location of the own vehicle.

Because the millimeter wave radar 12 detects side walls and a front ceiling of a tunnel and a road below an elevated road, it is possible for the lane boundary line recognition device 20 to detect with high accuracy the entrance into the tunnel and the road below the elevated road on the basis of the detection value of the millimeter wave radar 12.

It is possible to detect a difference in height between a road surface and an outside area of the road surface and a road state in which a height of the road decreases when it is separated from the road surface. Accordingly, it is possible for the environment change judgment section 23 in the lane boundary line recognition device 20 to detect whether or not the own vehicle enters and goes out from the causeway with high accuracy.

(Other Modifications)

It is possible to extract and detect various uncertainty factors, which affect the execution of the correct recognition of recognizing white lines, other than snow, gravel and puddle from the road image. It is possible for the calculation section 21 to calculate the degree of uncertainty of the uncertainty factors and integrate the calculated degree of uncertainty in order to calculate the degree of uncertainty of the road image. In a snow season and a heavy snow area, it is sufficient for the calculation section 21 to use the uncertainty factor of snow only. It is acceptable for the calculation section 21 to select the uncertainty factors of the road image according to the location and weather.

In general, there are various types of change of the road environment, for example, a change suitable for performing the correct recognition of white lines on a roadway, and a small change from the current road environment to a new road environment. It is possible for the learning resetting section 24 to determine a returning degree to return the current learning value to the previous learning value on the basis of the change state of the road environment. For example, when the own vehicle enters a tunnel or a road below an elevated road from a road having a large learning value of the degree of uncertainty, the learning value is returned to the initial value. When the own vehicle goes onto a causeway from a road having a large learning value of the degree of uncertainty, the degree of reducing the learning value is small. Further, when the own vehicle enters a junction or another drive lane, the degree of reducing the learning value is small because the degree of the road environment change is relatively small. When the degree of returning the learning value is determined on the basis of the state of the road environment change, it is possible for the lane boundary line recognition device 20 to restart the learning process of the degree of uncertainty on the basis of the optimal learning value of the degree of uncertainty. Further, it is possible to speedily perform the white line recognition process and the white line recognition suppression process.

It is acceptable to judge whether or not the road environment has changed on the basis of the map information stored in the map information storage section 11 or the current location of the own vehicle. It is also possible to judge whether or not the road environment has changed on the basis of the detection value of the millimeter wave radar 12 only. It is also possible to judge whether or not the road environment changes on the basis of the detection value transmitted from the stereo camera 13 only. Still further, it is possible to judge whether or not the road environment changes on the basis of the detection value transmitted from the millimeter wave radar 12 and the detection value transmitted from the stereo camera 13. It is also acceptable to detect whether or not the road environment has changed on the basis of detection results transmitted from another sensor.

It is also possible to determine the time when the road environment has changed. For example, it is not necessary to determine occurrence of the road environment changes when the own vehicle enters a junction or moves onto another drive lane. It is acceptable for the lane boundary line recognition device to determine when the road environment has changed due to another state other than the case when the own vehicle enters a tunnel, a road below the interchange, a junction and another drive lane. That is, it is sufficient for the lane boundary line recognition device to detect whether or not the road environment has changed on the basis of a state which is highly likely to change the degree of uncertainty for the roadway.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A lane boundary line recognition device capable of recognizing lane boundary lines on the basis of road images captured by an in-vehicle camera, the lane boundary line recognition device comprising:
   a calculation section capable of calculating a degree of uncertainty which affects a correct recognition of lane boundary lines on a roadway on which an own vehicle drives;
   a learning section capable of updating a learning value of the degree of uncertainty which affects the correct recognition of lane boundary lines;
   a recognition suppression section capable of suppressing an execution of the recognition of lane boundary lines when the learning value of the degree of uncertainty updated by the learning section is more than a threshold value;
   an environment change judgment section for judging whether or not a road environment has changed; and
   a learning resetting section for resetting the learning value of the degree of uncertainty to a previous learning value when the detection result of the environment change judgment section indicates an occurrence of change of the road environment.

2. The lane boundary line recognition device according to claim 1, wherein the learning resetting section returns the learning value of the degree of uncertainty to an initial value when the environment change judgment section judges the change of the road environment.

3. The lane boundary line recognition device according to claim 1, wherein the learning resetting section determines a value that the learning value of the degree of uncertainty is reset to on the basis of a state of change of the road environment.

4. The lane boundary line recognition device according to claim 1, wherein the environment change judgment section judges an occurrence of change of the road environment when the own vehicle enters a tunnel or a road below an elevated road.

5. The lane boundary line recognition device according to claim 1, wherein the environment change judgment section judges an occurrence of change of the road environment when the own vehicle enters a causeway.

6. The lane boundary line recognition device according to claim 1, wherein the environment change judgment section judges an occurrence of change of the road environment when the own vehicle enters an interchange.

7. The lane boundary line recognition device according to claim 1, wherein the environment change judgment section judges an occurrence of change of the road environment when the own vehicle enters a junction or another drive lane.

8. The lane boundary line recognition device according to claim 1, wherein the environment change judgment section judges an occurrence of change of the road environment on the basis of a map information and a current location of the own vehicle.

9. The lane boundary line recognition device according to claim 1, wherein the environment change judgment section judges an occurrence of change of the road environment on the basis of a detection value transmitted from a millimeter wave radar mounted on the own vehicle.

10. The lane boundary line recognition device according to claim 1, wherein the environment change judgment section judges an occurrence of change of the road environment on the basis of a road image captured by a stereo camera mounted on the own vehicle.

11. A non-transitory computer-readable storage medium for storing a program for causing a central processing unit in a computer system to execute the functions of the lane boundary line recognition device according to claim 1.

* * * * *